United States Patent
Ramsby et al.

(10) Patent No.: US 10,740,971 B2
(45) Date of Patent: Aug. 11, 2020

(54) AUGMENTED REALITY FIELD OF VIEW OBJECT FOLLOWER

(71) Applicant: Microsoft Technology Licensing, LLC, Redmond, WA (US)

(72) Inventors: Scott Ramsby, Kirkland, WA (US); Joe Thompson, Seattle, WA (US); Dan Osborn, Woodinville, WA (US); Shawn Crispin Wright, Sammamish, WA (US); Brian Kramp, Kirkland, WA (US); Megan Saunders, Kirkland, WA (US); Forest Woodcroft Gouin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 573 days.

(21) Appl. No.: 14/745,151

(22) Filed: Jun. 19, 2015

(65) Prior Publication Data
US 2016/0210784 A1    Jul. 21, 2016

Related U.S. Application Data

(60) Provisional application No. 62/105,673, filed on Jan. 20, 2015.

(51) Int. Cl.
*G06T 19/00*    (2011.01)
*G02B 27/01*    (2006.01)

(52) U.S. Cl.
CPC .......... *G06T 19/006* (2013.01); *G02B 27/017* (2013.01); *G02B 27/0172* (2013.01);
(Continued)

(58) Field of Classification Search
CPC .............. G06T 19/006; G02B 27/0172; G02B 2027/0123; G02B 2027/014
(Continued)

(56) References Cited

U.S. PATENT DOCUMENTS 5,577,961 A * 11/1996 Adamczyk .............. G06F 3/011
                                                                  345/419
5,608,850 A    3/1997 Robertson
(Continued)

FOREIGN PATENT DOCUMENTS

CN    104221077 A    12/2014
EP      2960896 A1   12/2015
(Continued)

OTHER PUBLICATIONS

Angelica, Amara D., "3D Augmented Reality Holograms are Finally Here (Almost)", Published on: Dec. 18, 2013 Available at: http://www.kurzweilai.net/3d-augmented-reality-holograms-are-finally-here-almost.

(Continued)

*Primary Examiner* — Sarah Lhymn
(74) *Attorney, Agent, or Firm* — Alleman Hall Creasman & Tuttle LLP

(57) ABSTRACT

A wearable, head-mounted display system includes a near-eye display to display an augmented reality object perceivable at an apparent real world depth and an apparent real world location by a wearer of the head-mounted display system, and a controller to adjust the apparent real world location of the augmented reality object as a function of a field of view (FOV) of the wearer. The function is based on a bounding region of the augmented reality object and one or more overlap parameters between the bounding region of the augmented reality object and the FOV of the wearer.

20 Claims, 10 Drawing Sheets

(52) U.S. Cl.
CPC .... *G02B 27/0176* (2013.01); *G02B 2027/014* (2013.01); *G02B 2027/0123* (2013.01); *G02B 2027/0134* (2013.01); *G02B 2027/0187* (2013.01)

(58) Field of Classification Search
USPC .............................. 345/619, 629, 632, 633
See application file for complete search history.

(56) References Cited

U.S. PATENT DOCUMENTS

| | | | |
|---|---|---|---|
| 7,312,766 | B1 | 12/2007 | Edwards |
| 7,881,901 | B2 | 2/2011 | Fein et al. |
| 8,127,251 | B2 | 2/2012 | Fein et al. |
| 8,665,260 | B2 | 3/2014 | McCrae et al. |
| 2012/0113092 | A1 | 5/2012 | Bar-Zeev et al. |
| 2012/0188148 | A1 | 7/2012 | DeJong |
| 2012/0275755 | A1* | 11/2012 | Southworth .......... G06T 19/006 386/200 |
| 2013/0021373 | A1* | 1/2013 | Vaught ................. G02B 27/017 345/633 |
| 2013/0106674 | A1 | 5/2013 | Wheeler et al. |
| 2013/0120224 | A1* | 5/2013 | Cajigas .................... G09G 5/00 345/8 |
| 2013/0208010 | A1 | 8/2013 | Oh et al. |
| 2013/0326364 | A1 | 12/2013 | Latta et al. |
| 2013/0332876 | A1 | 12/2013 | Johnson et al. |
| 2014/0049559 | A1 | 2/2014 | Fleck et al. |
| 2014/0118829 | A1 | 5/2014 | Ma et al. |
| 2014/0168056 | A1 | 6/2014 | Swaminathan et al. |
| 2014/0225898 | A1* | 8/2014 | Fyke ...................... G06T 11/00 345/473 |
| 2014/0253432 | A1 | 9/2014 | Ferguson |
| 2014/0267598 | A1 | 9/2014 | Drouin et al. |
| 2014/0282008 | A1 | 9/2014 | Verard et al. |
| 2014/0293385 | A1 | 10/2014 | Smithwick |
| 2014/0306994 | A1 | 10/2014 | Brown et al. |
| 2014/0375544 | A1 | 12/2014 | Venable et al. |
| 2015/0049002 | A1 | 2/2015 | Ishikawa et al. |

FOREIGN PATENT DOCUMENTS

| | | |
|---|---|---|
| JP | H095155 A | 1/1997 |
| WO | WO 201317173 A1 * | 11/2013 |
| WO | 2014128810 A1 | 8/2014 |

OTHER PUBLICATIONS

Angley, Natalie, "Glasses to make you a real-life Tony Stark", Published on: Oct. 31, 2013 Available at: http://edition.cnn.com/2013/10/31/tech/innovation/meta-augmented-reality-glasses/.

Hilliges, et al., "HoloDesk: Direct 3D Interactions with a Situated See-Through Display", In Proceedings of the SIGCHI Conference on Human Factors in Computing Systems, May 5, 2012, 10 pages.

ISA European Patent Office, International Search Report and Written Opinion issued in Application No. PCT/US2016/013309, dated Mar. 24, 2016, WIPO, 14 pages.

IPEA European Patent Office, Second Written Opinion Issued in PCT Application No. PCT/US2016/013309, dated Dec. 12, 2016, WIPO, 6 pages.

IPEA European Patent Office, International Preliminary Report on Patentability Issued in PCT Application No. PCT/US2016/013309, dated Mar. 31, 2017, WIPO, 10 Pages.

"Second Office Action Issued in Chinese Patent Application No. 201680006493.7", dated Jun. 18, 2019, 6 Pages. (MS# 356575-CN-PCT).

"Notice of Allowance Issued in Chinese Patent Application No. 201680006493.7", dated Nov. 7, 2019, 6 Pages. (MS# 356575-CN-PCT).

"Office Action Issued in Japanese Patent Application No. 2017-534550", dated Dec. 12, 2019, 6 Pages. (MS# 356575-JP-PCT).

"First office action and Search Report Issued in Chinese Patent Application No. 201680006493.7", dated Feb. 19, 2019, 11 Pages. (MS# 356575-CN-PCT).

\* cited by examiner

AUGMENTED REALITY FIELD OF VIEW OBJECT FOLLOWER

CROSS REFERENCE TO RELATED APPLICATIONS

This application claims priority to U.S. Provisional Patent Application No. 62/105,673, filed Jan. 20, 2015, the entirety of which is hereby incorporated herein by reference.

BACKGROUND

Stereoscopic displays can simultaneously present images to the left and right eyes of a viewer. By presenting different views of the same object at different positions in the right and left eye fields of view, a three-dimensional perception of the object can be achieved. Further, the perceived real world location of object may be adjusted as a user of the stereoscopic display moves about an environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples of positioning an augmented reality object as a function of a field of view of a user are presented. In one example, a wearable, head-mounted display system includes a near-eye display to display an augmented reality object perceivable at an apparent real world depth and an apparent real world location by a wearer of the head-mounted display system, and a controller to adjust the apparent real world location of the augmented reality object as a function of a field of view (FOV) of the wearer, the function based on a bounding region of the augmented reality object and one or more overlap parameters between the bounding region of the augmented reality object and the FOV of the wearer.

DETAILED DESCRIPTION

Near-eye display devices may be configured to display augmented reality images to provide the illusion that augmented reality objects, sometimes referred to as holograms, are present in the real world environment surrounding the near-eye display device. In some examples, an augmented reality object may be "world-locked," wherein the augmented reality object maintains a fixed perceived real-world location, even as a wearer of the display device moves about the real world physical environment. Such world-locked objects may be difficult for a wearer of the device to interact with, as the wearer may have trouble remembering where in the real-world space the object is located. This issue may be particularly challenging when the augmented reality object is a user interface element, such as a menu, control button, etc., due to the frequent interaction that may occur with the object.

According to embodiments disclosed herein, the perceived real world location of selected augmented reality objects may be adjusted as a field of view (FOV) of a wearer of a near-eye display device changes. A selected augmented reality object may have an associated function that defines a target region of interest of the augmented reality object to be displayed as well as overlap parameters that define how much of the target region of interest is to be displayed when the FOV of the wearer is moving and when the FOV is relatively steady. The movement of the augmented reality object as the FOV changes may be controlled by a virtual spring that allows the augmented reality object to stay in a relatively stable position when the FOV changes by a small amount and then quickly pulls the augmented reality object along with the FOV when the FOV moves by a larger amount. In this way, at least a portion of the augmented reality object may be easily accessible to the wearer of the device even as the wearer moves about the real world space.

Figure 1:
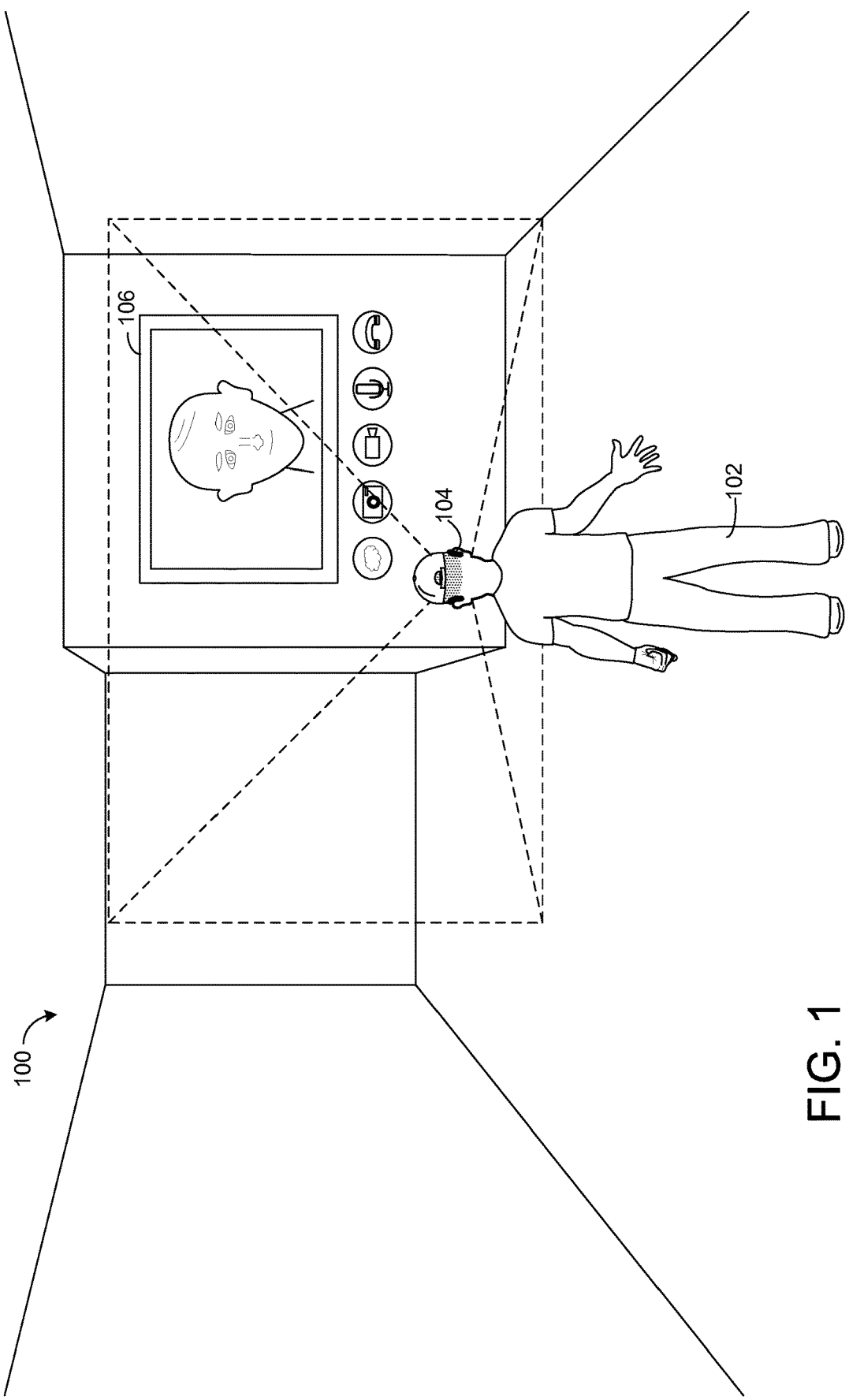
FIG. 1 shows an example environment including a user wearing a near-eye, see-through display device.

FIG. 1 shows an example environment 100 in which a user 102 is wearing near-eye, see-through display device, herein embodied as a head-mounted display (HMD) 104. The HMD provides user 102 a see-through view of environment 100. The HMD also displays augmented reality images to the user. In one example, the HMD is a stereoscopic display device, wherein two separate augmented reality images are each displayed on respective left-eye and right-eye displays of the HMD. When viewed by a wearer of the HMD (e.g., user 102), the two augmented reality images collectively form an augmented reality object perceivable by the wearer as part of environment 100. FIG. 1 depicts an example augmented reality object 106, herein depicted as a video conference interface including a virtual display and control buttons. It is to be understood that the depicted augmented reality object is not visible to others in environment 100, and the augmented reality object can only be seen by user 102 via HMD 104.

HMD 104 can display augmented reality images such that perceived augmented reality objects are body-locked and/or world-locked. A body-locked augmented reality object moves as the six-degree-of-freedom pose (i.e., 6DOF: x, y, z, yaw, pitch, roll) of HMD 104 changes. As such, a body-locked augmented reality object appears to occupy the same portion of the field of view of user 102 and appears to be at the same distance from user 102, even as the user moves, turns, etc.

On the other hand, a world-locked augmented reality object appears to remain in a fixed location relative to the surrounding environment. Even as a user moves and the user's perspective changes, a world-locked augmented reality object will appear to be in the same position/orientation relative to the surrounding environment. As an example, an augmented reality chess piece may appear to be on the same square of a real world chess board regardless of the vantage point from which a user views the chess board. To support a world-locked augmented reality object, an HMD may track the 6DOF pose of the HMD and a geometric mapping/modeling of surface aspects of the surrounding environment.

As illustrated in FIG. 1, user 102 is currently fully interacting with the augmented reality object 106, and as such the augmented reality object is displayed at a size and location optimized for the function of the augmented reality object. In the illustrated example, the augmented reality object is a video conference interface, and thus the augmented reality object is positioned near the center of the FOV of the user and at a size that allows the user to easily visualize the virtual display and control buttons.

However, if the user were to move around the environment 100, maintaining the augmented reality object in the center of the field of view and/or at such a relatively large size may obscure real world objects present in the environment, distract the user from other tasks he or she may desire to carry out, or cause other issues. If the augmented reality object were to stay locked to its current perceived real-world location, it may be difficult for the user to access the augmented reality object at a later time if the user has moved from the environment.

According to the present disclosure, the augmented reality object 106 may be moved according to a modified body-locked function such that at least a portion of the augmented reality object remains tethered to a given position within the user's FOV. As used herein, the term "FOV of the user" may refer to the actual field of view of the user, or it may refer to the field of view of the user via the display, i.e., the field of view of the display. In some examples, the FOV may refer to the smaller of the user's FOV and the display FOV.

The tethering may be controlled according to a virtual spring function to allow the object to remain in the same apparent real-world location when the FOV of the user is changing by a relatively small amount and then to move the object when the FOV changes by a larger amount. When the FOV of the user changes by a relatively large amount, the movement of the object can be controlled so that the most or all of the object remains in the FOV, only a portion remains in the FOV, or none of the object remains in the FOV. When the FOV stops changing (e.g., the user's head comes to a rest), the object may be placed back into the FOV, albeit at a smaller size, smaller proportion, and/or at a location that is in the periphery of the FOV. When the object is out of the FOV of the user, the object may still be tethered to the FOV, such that the apparent real-world location of the object is still updated, even if the object is not currently displayed.

While the above examples are described with respect to a near-eye, see-through display system, it is to be understood that the examples described herein are not limited to a see-through display system, as other configurations are possible. For example, the tethering of a virtual or augmented reality object to a FOV of a user may be performed on non-see-through displays with reprojections from attached digital cameras into an enclosed screen composited with virtual digital content. In another example, the tethering may be performed on a complete virtual reality system where virtual reality objects are presented along with a video feed of a real world or virtual environment.

Figure 2A:
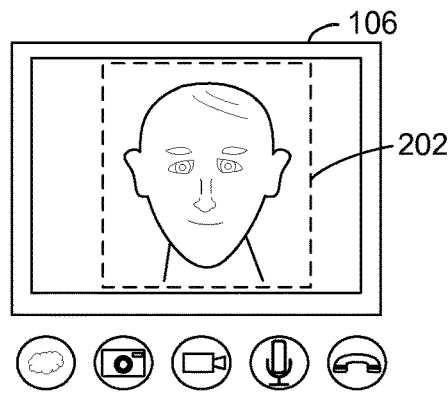
FIGS. 2A-2C show example aspects of a modified body-locked function that may be applied to an augmented reality object.
Figure 2B:
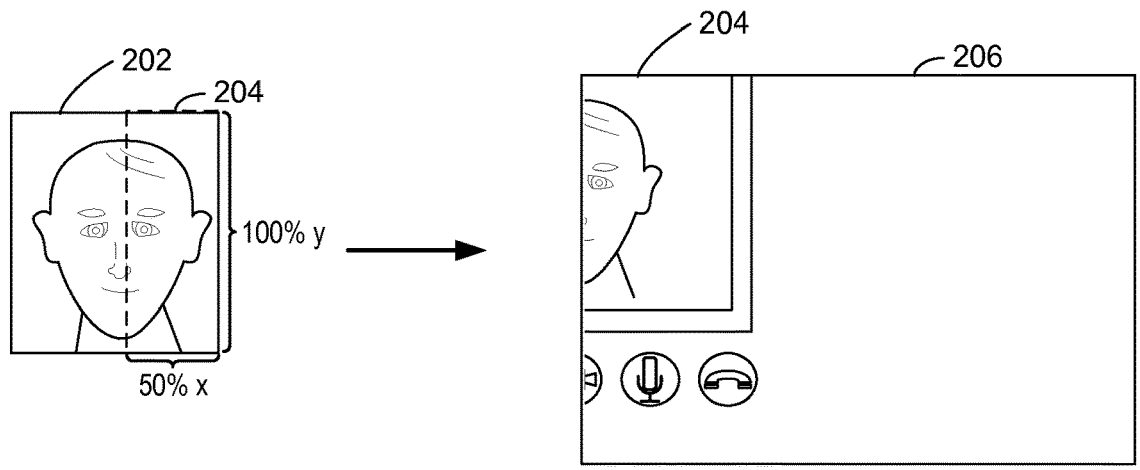
Figure 2C:
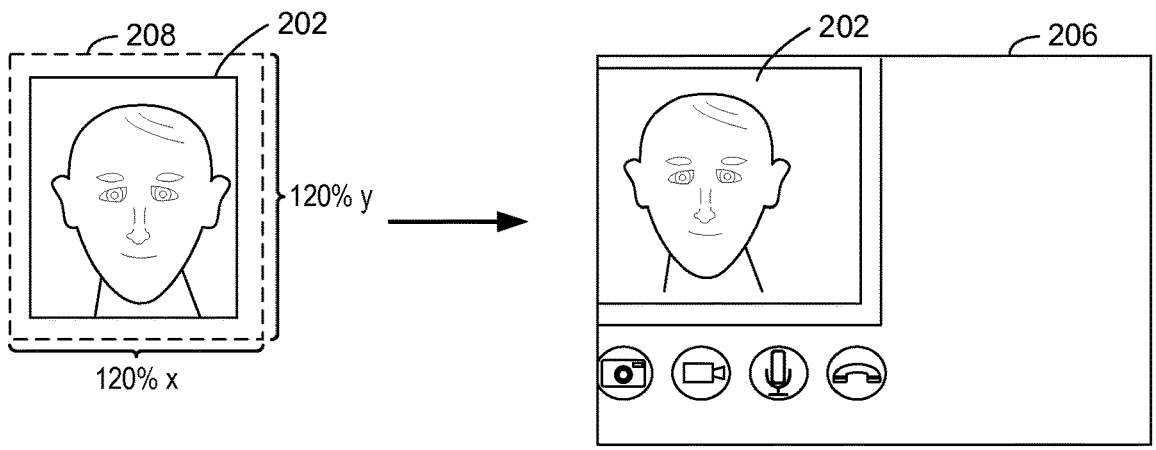

As explained above, the apparent real-world location of an augmented reality object may be adjusted as a function of the FOV of a wearer of a display device. This function may be based on a variety of parameters, including a bounding region of the augmented reality object and one or more overlap parameters between the FOV and the augmented reality object. FIGS. 2A-2C illustrate an example bounding region and two overlap parameters that may be applied to the augmented reality object 106 of FIG. 1 in order to display a desired portion of the augmented reality object both as the FOV of the user changes and as the FOV remains relatively stable.

Referring first to FIG. 2A, the augmented reality object 106 includes an associated bounding region 202. The bounding region 202 defines a target region of interest of the augmented reality object upon which FOV-inclusion calculations can be based. For example, FOV inclusion may be set such that the entirety of the bounding region is to be displayed when a user is not actively interacting with the augmented reality object, but areas outside of the bounding region may be allowed to move outside the FOV. In the illustrated example, the bounding region 202 includes a portion of the virtual display where a remote user of the video conference is displayed.

In some examples, the bounding region may be the same size and shape as the augmented reality object. That is, the bounding region may comprise the entirety of the augmented reality object, such that no aspects of the augmented reality object are omitted from the bounding region. In other examples, the bounding region may comprise a space that is smaller in area or volume than the augmented reality object, as illustrated. In still further examples, the bounding region may comprise a space that is larger in area or volume than the augmented reality object.

Bounding regions may be individually defined for each augmented reality object or for classes of augmented reality objects. Bounding regions can be explicitly defined as a fixed area/volume, or bounding regions can be defined as a proportional size relative to the augmented reality object.

In addition to the bounding region, one or more overlap parameters may dictate placement of the augmented reality object within the FOV. FIG. 2B illustrates a moving minimum overlap parameter 204 that defines overlap between the bounding region and the FOV when the FOV is changing by a relatively large amount. In some examples, the minimum overlap parameter may be applied only once the displayed augmented reality object starts to exit the FOV. The minimum overlap parameter may be defined as a percentage of the bounding region along one or more axes. The minimum overlap parameter can be smaller (less than 100% along one or more axes), larger (greater than 100% along one or more axes), or the same size (100% along one or more axes) as the bounding region.

The minimum overlap parameter may be a positive or negative value. When the minimum overlap parameter is a positive value, at least a portion of the bounding region of the augmented reality object remains in the FOV when the FOV is changing. However, when the minimum overlap parameter is a negative value, the bounding region does not remain in the FOV, and thus, in some examples this may include none of the augmented reality object being displayed to the user. For example, an x axis minimum overlap parameter of negative 100% would allow the bounding region to move outside of the field of view by 100% of the x axis dimension of the bounding region.

As shown in FIG. 2B, the minimum overlap parameter 204 is set at 50% of the bounding region in the x-axis and 100% of the bounding region in the y-axis. Accordingly, when the FOV of the user changes and the augmented reality object begins to exit the FOV, at least 50% of the bounding region in the x axis is displayed and 100% of the bounding region in the y-axis is displayed. The 50% of the bounding region that is displayed in the x axis depends on which way the FOV is changing. For example, as the user looks to the right, the left edge of the FOV will appear to push the augmented reality object and keep the right 50% of the width of the bounding region in the FOV. This scenario is illustrated in FIG. 2B. However, if the user looks to the left, the right edge of the FOV will appear to push the augmented reality object and keep the left 50% of the width of the bounding region in the FOV. The minimum overlap parameter illustrated in FIG. 2B is exemplary in nature, and other minimum overlap parameter values are possible.

FIG. 2C illustrates a resting target overlap parameter 208 that defines overlap between the bounding region and the FOV when the FOV is not changing or is changing by a relatively small amount (e.g., when the user's head comes to a rest or when the FOV is changing, but not by enough to cause the bounding region to move outside the FOV). In the example illustrated, the target overlap parameter 208 is larger than the minimum overlap parameter 204 and is 120% of the bounding region in the x-axis and 120% of the bounding region in the y-axis. When displayed in the FOV 206 according to the target overlap parameter 208, the entirety of the bounding region 202 is displayed. Further, the additional overlap beyond the dimensions of the bounding region provides for display of additional space of the augmented reality object around the bounding region. Similar to the minimum overlap parameter, the target overlap parameter may be a positive value (as illustrated) or a negative value, such that the bounding region is displayed within the FOV or is not displayed within the FOV.

In the example illustrated in FIGS. 2B and 2C, 50% of the x axis of the bounding region may be displayed as the user turns his head to the right. When the user's head stops turning, the augmented reality device may switch from using the moving minimum overlap parameter 204 to using the target overlap parameter 208. As such, the augmented reality object will continue to move even after the FOV stops changing.

The augmented reality object may move according to one or more spring parameters of a virtual spring function. Nonlimiting examples of spring parameters include a spring constant and a dampening factor. For example, a spring constant may dictate how rigidly the augmented reality object moves relative to the FOV. A low spring constant will allow the augmented reality object to stretch farther out of the FOV as the FOV changes rapidly. A high spring constant will keep the augmented reality object closer to the position determined from the bounding region and overlap parameter(s). A high dampening factor will prevent oscillation of the augmented reality object when a rapidly changing FOV stops changing. A high dampening factor will also decrease the amount of time it takes for the augmented reality to stabilize in a nonmoving FOV after the FOV comes to rest. A low dampening factor will allow oscillation and will not stabilize an augmented reality object as quickly in the FOV.

Figure 3:
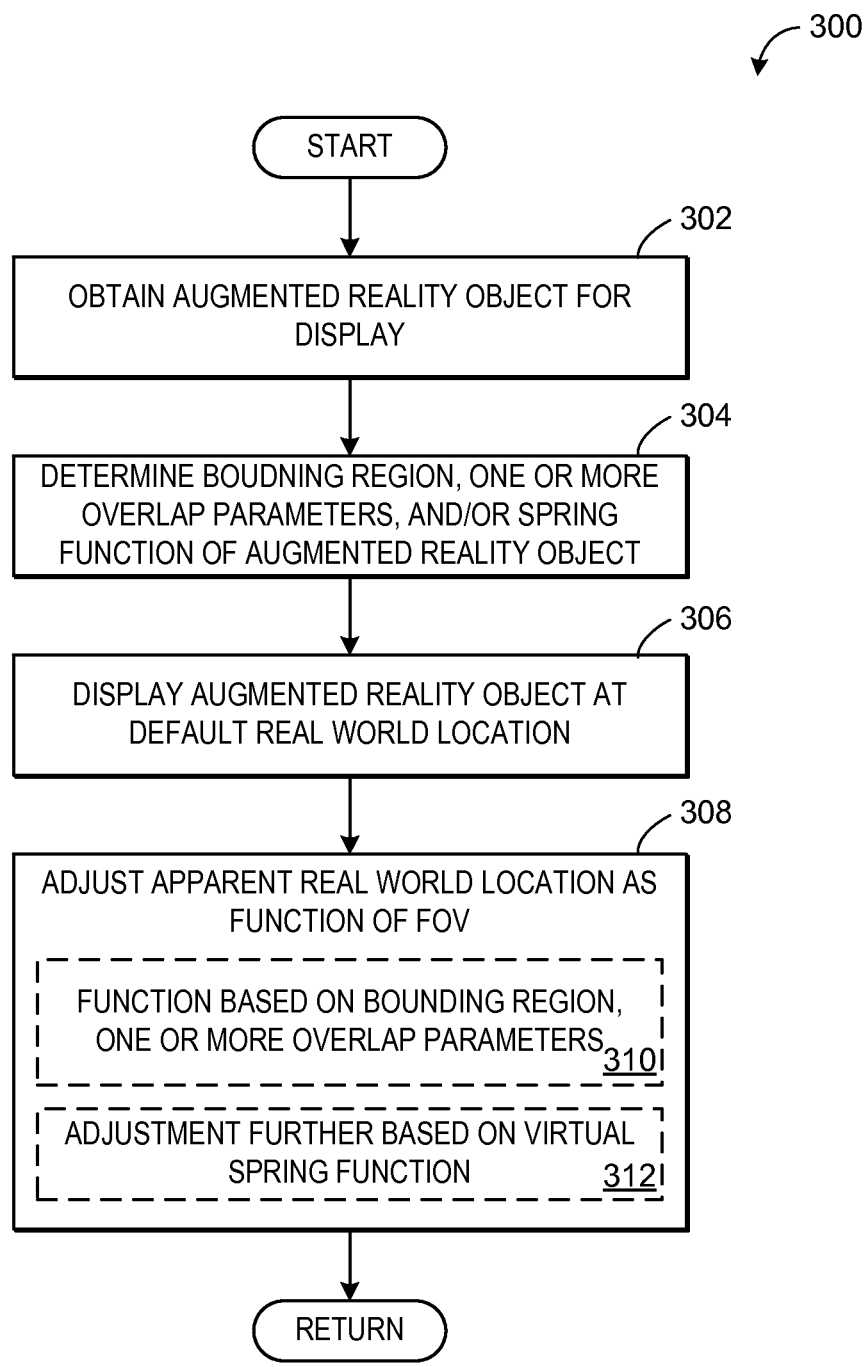
FIG. 3 is a flow chart illustrating a method for displaying an augmented reality object.

Turning now to FIG. 3, a method 300 for displaying an augmented reality object is illustrated. Method 300 may be enacted in a wearable, head-mounted display system, such as HMD 104 of FIG. 1 described hereinabove, or head-mounted display system 1000 of FIG. 10A, described below.

At 302, method 300 includes obtaining an augmented reality object for display on the display system. The augmented reality object may include any suitable augmented reality content and may be displayed as part of a graphical user interface, game, guidance or assistance system, or any suitable augmented or immersive environment. The augmented reality object may be obtained from a remote service, from a memory of the display system, or other suitable source in response to user input, predetermined sequence of an executed game or other content, or other suitable action. The augmented reality object may include geometric parameters (e.g., three-dimensional vertices defining a shape of the augmented reality object), textures, and/or other aspects. The augmented reality object may be saved as any combination of suitable data structures. In some examples, the augmented reality object may be used to render a right-eye and left-eye augmented reality image, each configured to be displayed on respective right-eye and left-eye displays of the display system.

At 304, the method includes determining the bounding region, one or more overlap parameters, and/or a virtual spring function of the augmented reality object. As explained above with respect to FIGS. 2A-2C, the bounding region and the overlap parameters cooperatively define the space (2-D area or 3-D volume) of the augmented reality object that is to be displayed. The virtual spring function may define movement of the bounding region relative to the FOV. The bounding region, overlap parameters, and/or virtual spring function may be associated with an augmented reality object in any suitable manner. As one example, these parameters may be saved as variables that can be accessed while rendering the augmented reality scene.

At 306, the augmented reality object is displayed at a default apparent real world location. For example, the augmented reality object may include a default location relative to the user or relative to the real world where it may be displayed for user interaction. This may include a default apparent real world depth. Further, the augmented reality object may be displayed at a default size. Additionally, in some examples the augmented reality object may be displayed at one or more of the apparent real world location, apparent real world depth, and size according to user input.

At 308, method 300 includes adjusting the apparent real world location of the augmented reality object as a function of the FOV of the user. The adjustment may include adjusting the apparent real world location as a function of the FOV, where the function is based on the bounding region and one or more overlap parameters, as indicated at 310. Further, the adjustment may include adjusting the apparent real world location of the object further based on the virtual spring function, as indicated at 312.

To adjust the apparent real world location of the augmented reality object as a function of the FOV of the user, the display system may first determine the FOV of the user based on feedback from one or more image sensors and/or position sensors of the display system. The display system may then determine if the FOV has moved by at least a threshold amount. In one example, the threshold may be zero, such that the display system may determine if the FOV has changed at all. In other examples, the threshold may be a predetermined amount that is greater than zero, such as 5 or 10%. In still further examples, the threshold may be based on the initial location of the augmented reality object relative to one or more boundaries of the FOV. For example, the display system may indicate that the FOV has moved by at least the threshold amount only if the augmented reality object begins to exit the FOV. Other thresholds are possible.

If the FOV has moved by at least the threshold amount, the display system may display the augmented reality object according to the bounding region associated with the augmented reality object and the one or more overlap parameters, as explained above with respect to FIG. 2B. Further, the augmented reality object may be made to move as if tethered to a spring according to the one or more spring parameters. In some implementations, the spring parameters are not allowed to violate conditions established by the bounding region and overlap parameter(s). In other words, the minimum overlap is a hard minimum that cannot be violated. In other implementations, the spring parameters are allowed to cause the overlap(s) to be violated (e.g., augmented reality object stretches farther out of FOV when FOV changes rapidly). Once the FOV stops changing (e.g., the user's head comes to a rest), the bounding region may be displayed at an apparent real world location according to one or more of the virtual spring function and target overlap parameter. However, depending on the damping factor of the virtual spring function, the bounding region may temporarily "over-shoot" the apparent real world location specified by the target overlap parameter before stabilizing at the specified location. In some examples where the target overlap parameter defines that less than all of the augmented reality object is displayed once the augmented reality object is displayed at a stable position, responsive to a user input (e.g., the user looking at the augmented reality object), the entirety of the augmented reality object may be displayed.

While in the above examples the bounding region is defined as including a space of the augmented reality object, in some examples the bounding region may not comprise an exact version of some or all of the augmented reality object but may instead include a representation of the augmented reality object, such as an image, icon, menu bar, etc., that signifies the content of the augmented reality object such that the user is able to identify the augmented reality object.

Figure 4:
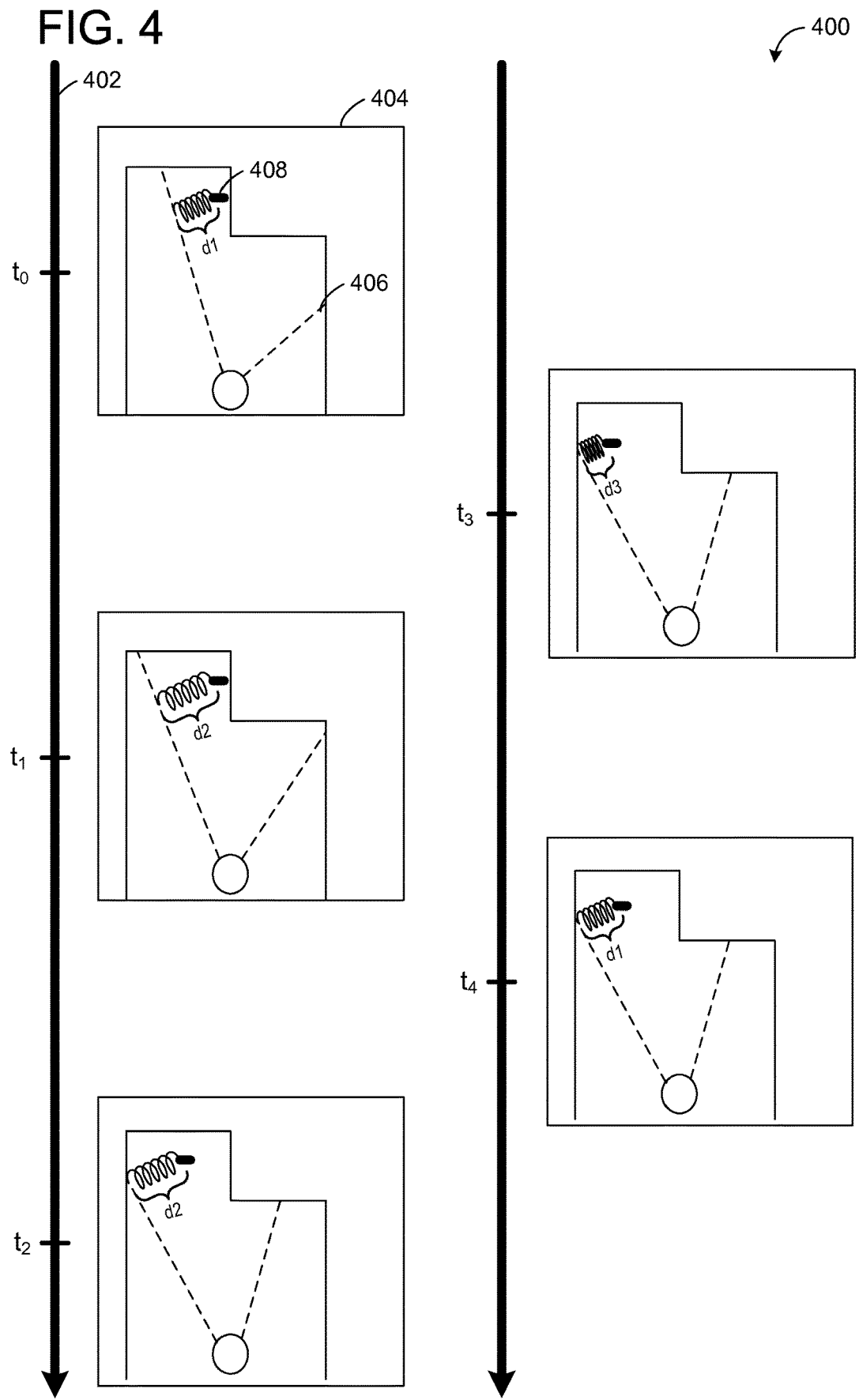
FIG. 4 is a diagram illustrating example movements of an augmented reality object according to a virtual spring function.

FIG. 4 is a diagram 400 illustrating an exemplary series of movements of an augmented reality object according to a virtual spring function. Diagram 400 includes a timeline 402 displaying a series of time points (e.g., $t_0$-$t_4$) and associated overhead maps 404 showing the field of view 406 (demarcated by the dashed lines) of a user in an environment, such as user 102 in environment 100 of FIG. 1. A bounding region 408 of an augmented reality object is displayed within the FOV 406 according to a virtual spring function. While the overhead maps in FIG. 4 illustrate a visible spring, it is be understood that the spring is visible for illustrative purposes only, and that the display system need not display a spring.

At time $t_0$, the spring is in its resting position, where no force is acting on the spring. The spring is anchored to a position relative to the FOV, herein depicted as being along a left boundary of the FOV. Accordingly, the bounding region 408 is positioned spaced away from the anchor location by a first distance, d1. At time $t_1$, the FOV begins to move toward the left, and hence the anchor begins to move. However, the spring expands, resulting in the bounding region remaining at the same apparent real world location. The bounding region is now positioned spaced away from the anchor location by a second distance, d2, that is larger than the first distance. The amount of spring expansion can be determined by the spring constant, the rate the FOV changes, and a virtual inertia assigned to the augmented reality object.

As shown at time $t_2$, the FOV keeps moving left, the spring reaches a greater level of expansion, and the bounding region moves along with the FOV. As such, the bounding region is spaced apart from the anchor location by the same distance d2, but the bounding region is positioned at an apparent real world location that is more to the left than at times $t_0$ and $t_1$. For example, at times $t_0$ and $t_1$, the bounding region is positioned relatively near a wall in the environment; at time $t_2$, it has shifted away from the wall.

At time $t_3$, the FOV stops moving. However, the spring continues to compress, causing the bounding region to keep moving toward the left. The anchor location and bounding region are spaced apart at a third distance, d3, that is smaller than the first and second distances. By time $t_4$, the spring has regained its relaxed state, and the bounding region is the same distance (d1) from the anchor location as at time $t_0$.

Figure 5:
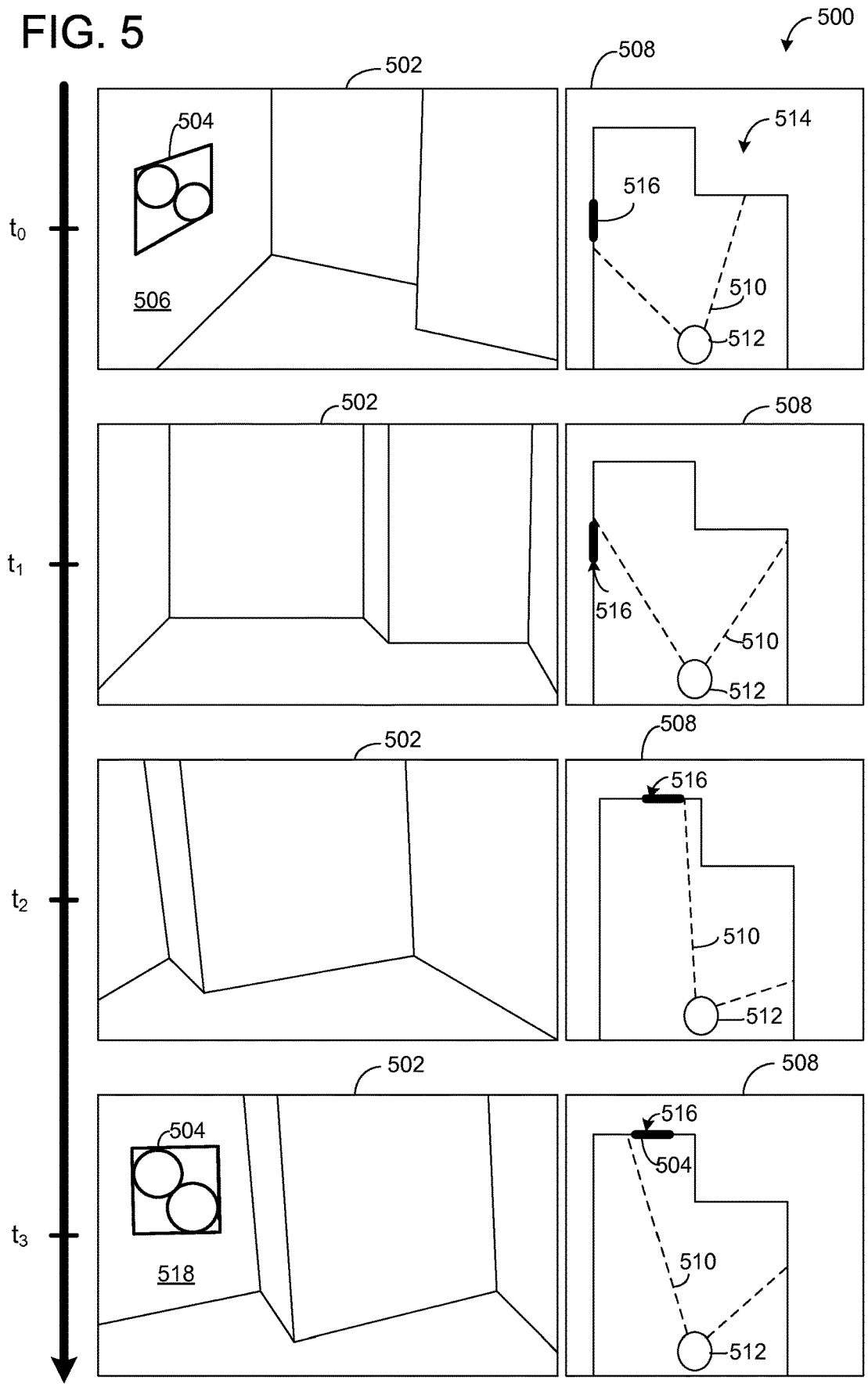
FIGS. 5-8 are diagrams illustrating various example adjustments to an augmented reality object as a function of field of view of a user.

FIG. 5 shows another diagram 500 illustrating a timeline of example views 502 through an HMD, such as HMD 104 of FIG. 1, from the perspective of a user at times $t_0$, $t_1$, $t_2$, and $t_3$, including an augmented reality object 504. The augmented reality object 504 is world-locked to wall 506 at time $t_0$. FIG. 5 also shows an overhead map 508 showing the field of view 510 of user 512 in environment 514. At times $t_1$ and $t_2$ user 512 turns his head to the right and can no longer see augmented reality object 504 in its original world-locked position. However, as shown in overhead map 508 at times $t_1$ and $t_2$, a position 516 of the augmented reality object is dynamically updated to stay just outside of the field of view 510, due to the augmented reality object having a negative minimum overlap parameter value. At time $t_3$, user 512 turns his head back to the left such that field of view 510 includes updated position 516. Furthermore, as shown in view 502 at time $t_3$, the augmented reality image is displayed at the updated position 516.

A dynamically positioned augmented reality object may be dynamically placed at an appropriate depth for convenient use when the user glances back towards the dynamically-positioned augmented reality object. For example, the augmented reality object may be pushed back to the nearest real-world physical surface or pulled up to a configurable depth based upon a current context (e.g., application scenario). FIG. 5 shows an example where augmented reality object 504 is pushed back to the nearest physical surface, in this case, wall 518.

Figure 6:
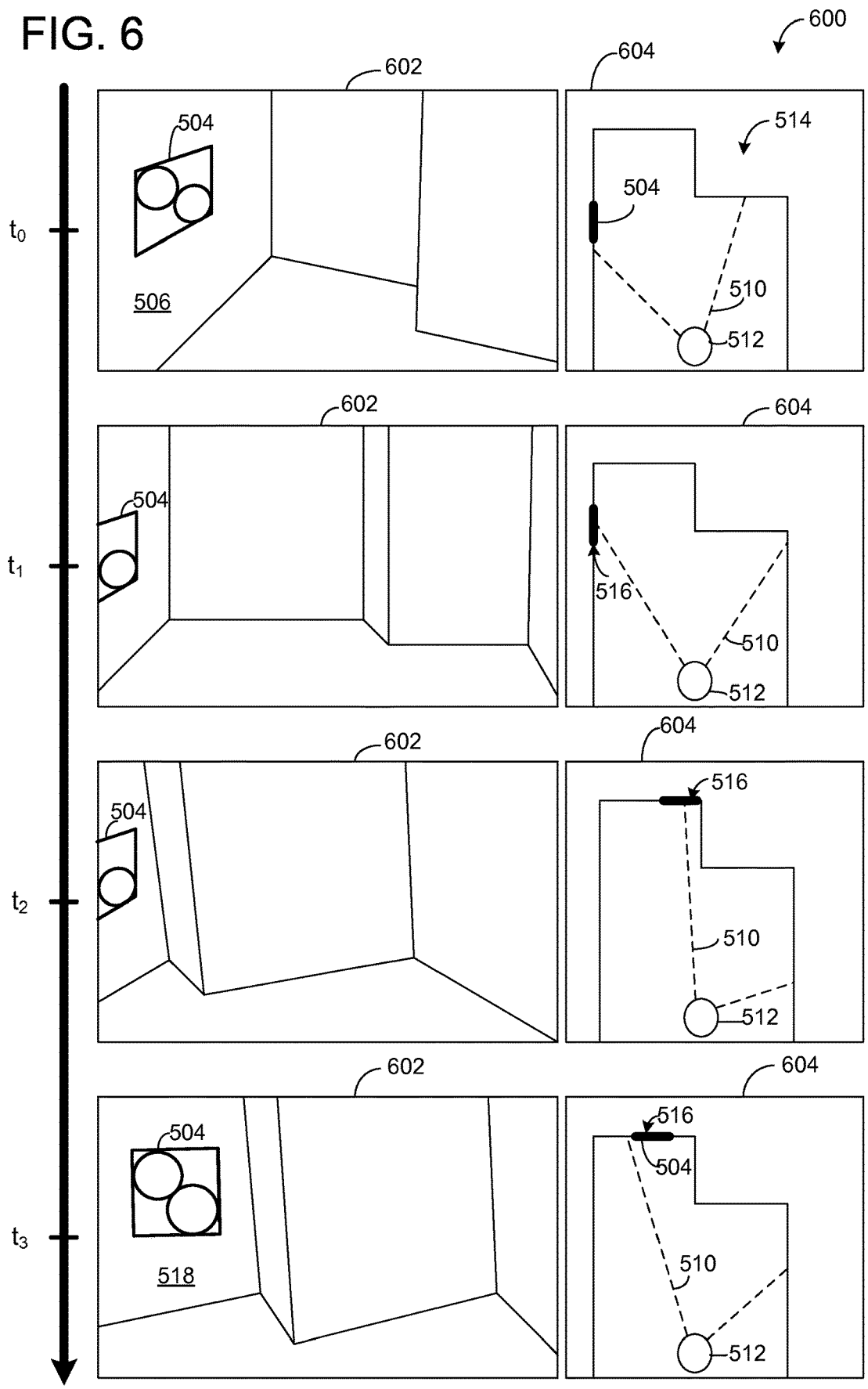

FIG. 6 shows another diagram 600 of a timeline of example views 602 through an HMD and corresponding overhead maps 604. Diagram 600 includes views of the same augmented reality object 504 and same environment 514 illustrated in FIG. 5, along with the same movements of user 512. However, in FIG. 6, the augmented reality object 504 has a positive minimum overlap parameter value. Accordingly, as seen at times $t_1$ and $t_2$, the augmented reality object stays partially within the FOV 510 of user 512.

As mentioned previously, an augmented reality object may be placed at desired apparent real world depth, for example in the timeline illustrated in FIGS. 5 and 6, the apparent real world depth of the augmented reality object is adjusted so that it appears to be placed against a wall. When depth is automatically adjusted, an augmented reality object, or aspects of the augmented reality object, may be dynamically scaled according to a fixed angular size so that the augmented reality object, or aspects thereof, appear to take up the same proportion of a user's field of view, regardless of the apparent real world distance at which the augmented reality object is displayed. As an example, a horizontal line drawn on a vertical surface five feet away from the user may occupy a 0.95 degree vertical angular spread and the horizontal line may appear to be one inch tall in world space coordinates; when the same line is drawn on a vertical surface ten feet from the user, the line may still occupy a 0.95 degree vertical angular spread but appear to be two inches tall in world space coordinates. In this way, the augmented reality object may be maintained at a fixed proportion of the FOV of the user throughout a range of apparent real world depths of the augmented reality object.

Figure 7:
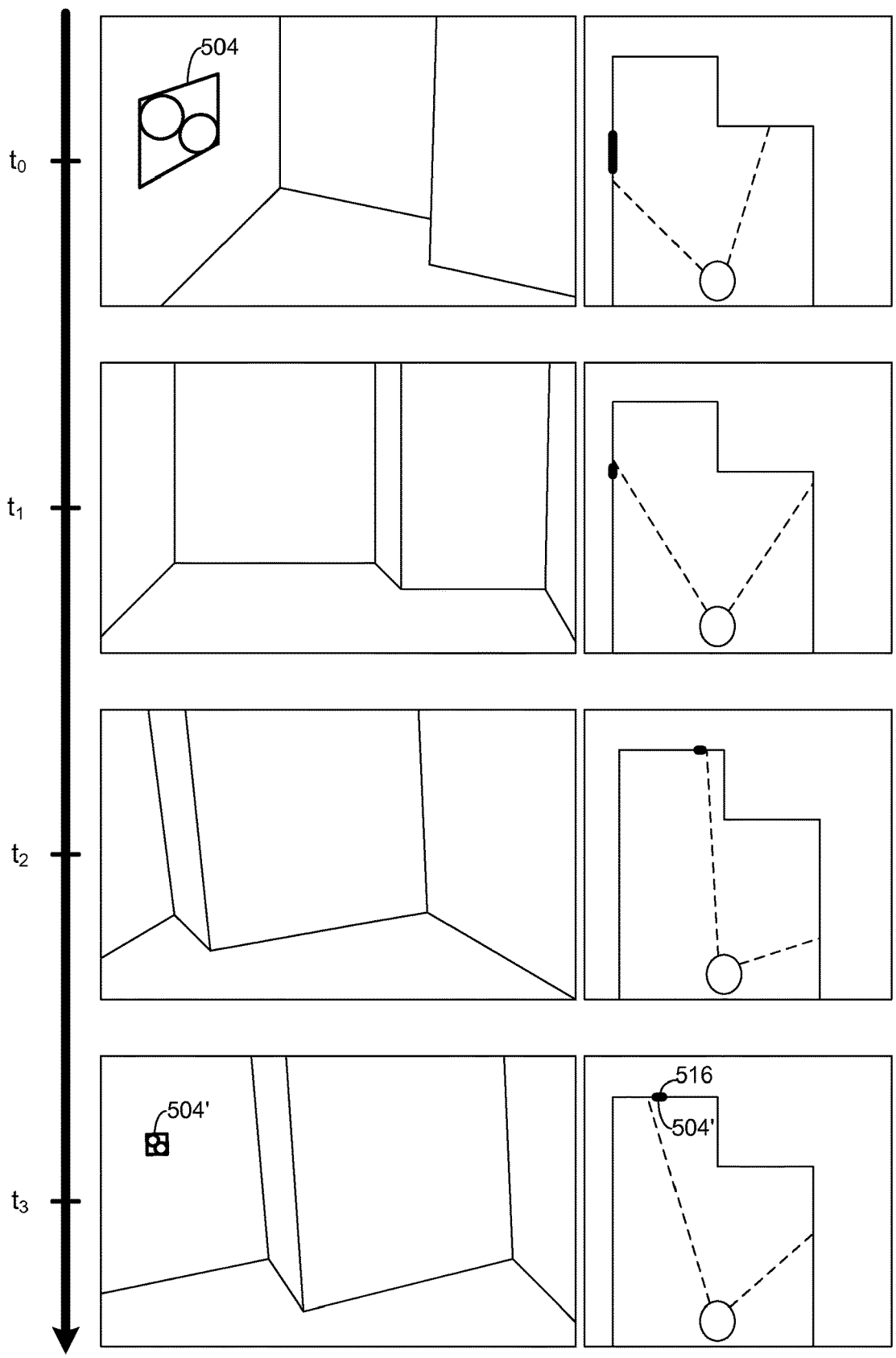

A dynamically-positioned augmented reality object may be dynamically scaled so as to appear smaller when the user glances back and views the augmented reality object in a new, dynamically-adjusted position. As an example, FIG. 7 shows augmented reality object 504' with a decreased size when the user glances back at updated position 516.

Figure 8:
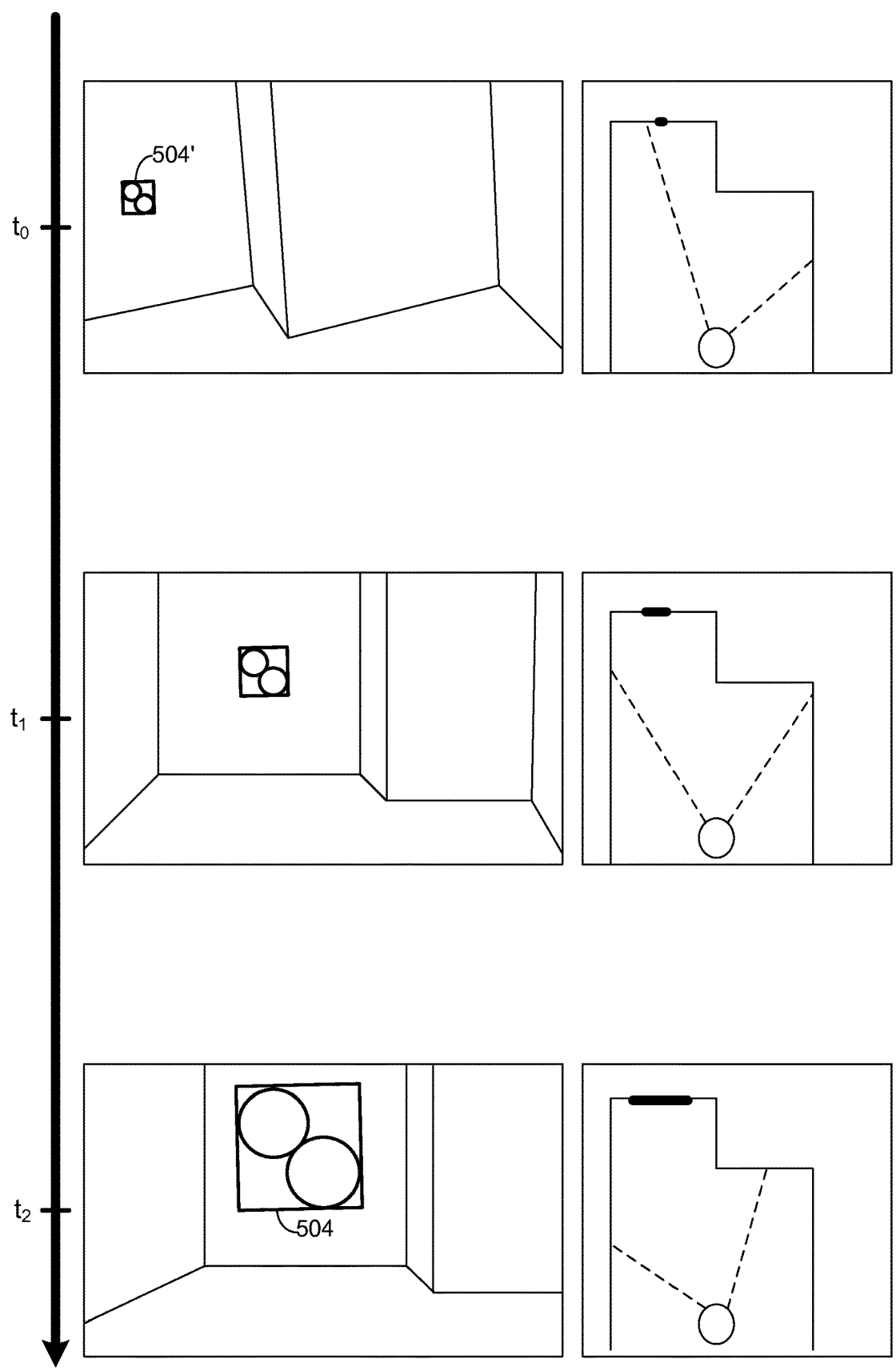

If an augmented reality object is scaled, the augmented reality object may be scaled back to an original size responsive to a user trigger, such as gazing at the augmented reality object for a threshold duration. FIG. 8 shows an example in which user 512 gazes at augmented reality object 504' for a threshold duration (e.g., $t_2-t_1$). The gaze triggers an enlarging of the diminished augmented reality object 504' to the full-size augmented reality object 504. Such enlarging may occur in one discrete step after the threshold duration is reached, or the enlarging can occur in two or more steps as shown.

Regardless of whether dynamic scaling is used, the dynamically-moved augmented reality object may automatically return to a previous location if a user trigger is not performed within a threshold duration. For example, if a user does not gaze at the dynamically moved augmented reality object within a threshold duration, the augmented reality object may automatically leave the user's field of view and return to an original location.

In addition to the scaling functions described above, an augmented reality object optionally may be displayed with a "billboarding" effect in which the augmented reality object is dynamically rotated to face the user so that the augmented reality object can be easily interacted with and viewed. For example, the bounding region may define a plane of the augmented reality object, and the thus the augmented reality object may be rotated to maintain that plane of the augmented reality object within the FOV. In some examples, an augmented reality object that would otherwise be adjusted as a function of the FOV of the user may be pinned to a fixed apparent real world location in response to a user request.

In further examples, an augmented reality object may animate (e.g. rotate along an axis defined by its direction of movement in response to being pulled by the virtual spring function described above) to give the user a stronger sense of the physical nature of the spring mechanism and its controlled augmented reality objects.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
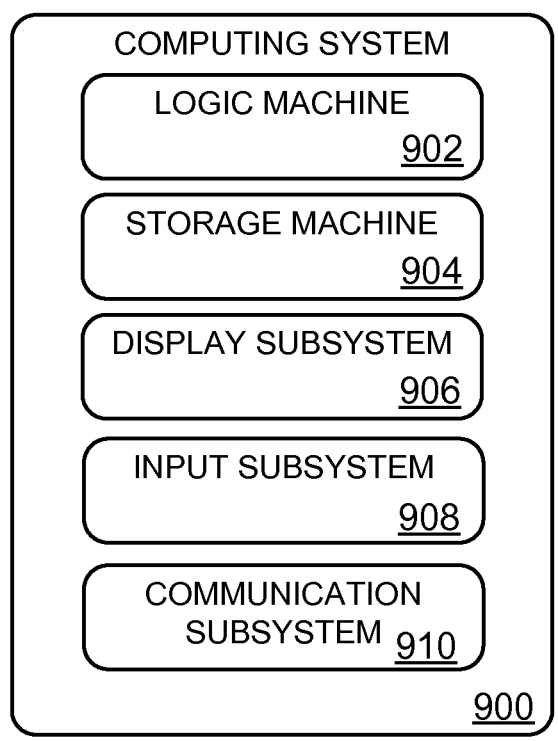
FIG. 9 shows an example computing system.

FIG. 9 schematically shows a non-limiting embodiment of a computing system 900 that can enact one or more of the methods and processes described above. HMD 104 of FIG. 1 and/or display system 1000 of FIG. 10A, described below, are non-limiting examples of computing system 900. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 904 includes one or more physical devices configured to hold instructions executable by the logic machine to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 902 executing instructions held by storage machine 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage machine 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

Figure 10A:
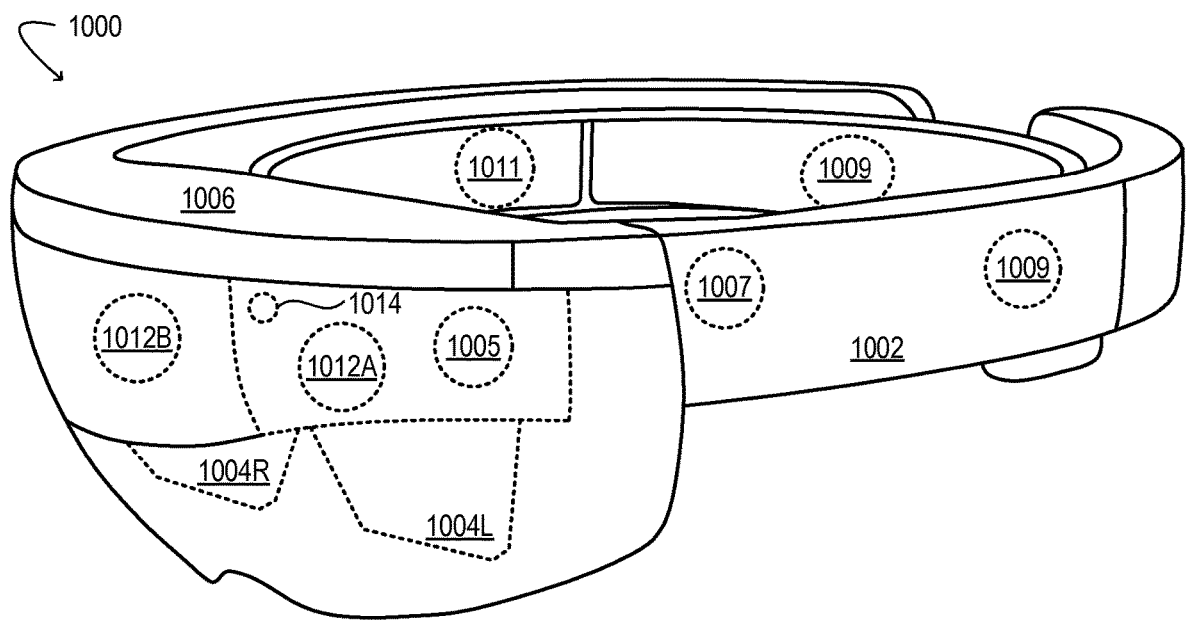
FIGS. 10A and 10B shows an example head-mounted display device.

FIG. 10A shows aspects of an example head-mounted display system 1000 to be worn and used by a wearer. Display system 1000 is a non-limiting example of the HMD 104 of FIG. 1 and/or the computing system 900 of FIG. 9. The display system may take any other suitable form in which a transparent, semi-transparent, and/or non-transparent display is supported in front of a viewer's eye or eyes. Further, embodiments described herein may be used with any other suitable computing device, including but not limited to mobile computing devices, laptop computers, desktop computers, tablet computers, other wearable computers, etc. For example, an augmented reality image may be displayed on a mobile phone's display along with real world imagery captured by the mobile phone's camera.

The illustrated display system includes a frame 1002. The frame supports stereoscopic, see-through display componentry, which is positioned close to the wearer's eyes. Display system 1000 may be used in augmented-reality applications, where real-world imagery is admixed with virtual display imagery.

Display system 1000 includes separate right and left display panels, 1004R and 1004L, which may be wholly or partly transparent from the perspective of the wearer, to give the wearer a clear view of his or her surroundings. Controller 1006 is operatively coupled to the display panels and to other display-system componentry. The controller includes logic and associated computer memory configured to provide image signals to the display panels, to receive sensory signals, and to enact the various control processes described herein.

Display system 1000 may enable images such as augmented reality images (also referred to as holographic objects) to be delivered to the eyes of a wearer of the display system. The display panels may be configured to visually augment an appearance of a real-world, physical environment to a wearer viewing the physical environment through the transparent display. In one example, the display may be configured to display one or more UI objects of a graphical user interface. In some embodiments, the UI objects presented on the graphical user interface may be virtual objects overlaid in front of the real-world environment. Likewise, in some embodiments, the UI objects presented on the graphical user interface may incorporate elements of real-world objects of the real-world environment seen through the display. In other examples, the display may be configured to display one or more other graphical objects, such as virtual objects associated with games, videos, or other visual content.

Any suitable mechanism may be used to display images via the display panels (collectively referred to as display 1004). For example, the display 1004 may include image-producing elements located within lenses (such as, for example, a see-through Organic Light-Emitting Diode (OLED) display). As another example, the display 1004 may include a display device (such as, for example a liquid crystal on silicon (LCOS) device or OLED microdisplay) located within frame 1002 of display system 1000. In this example, the lenses may serve as, or otherwise include, a light guide for delivering light from the display device to the eyes of a wearer. Such a light guide may enable a wearer to perceive a 3D holographic image located within the physical environment that the wearer is viewing, while also allowing the wearer to directly view physical objects in the physical environment, thus creating a mixed reality environment. Additionally or alternatively, the display 1004 may present left-eye and right-eye augmented reality images via respective left-eye and right-eye displays.

The display system 1000 may also include various sensors and related systems to provide information to the controller 1006. Such sensors may include, but are not limited to, one or more inward facing image sensors 1012a and 1012b, one or more outward facing image sensors 1005, an inertial measurement unit (IMU) 1007, and one or more microphones 1011. The one or more inward facing image sensors 1012a and 1012b may be configured to acquire image data in the form of gaze tracking data from a wearer's eyes (e.g., sensor 1012a may acquire image data for one of the wearer's eye and sensor 1012b may acquire image data for the other of the wearer's eye).

The display system may be configured to determine gaze directions of each of a wearer's eyes in any suitable manner based on the information received from the image sensors 1012a and 1012b. For example, one or more light sources 1014, such as infrared light sources, may be configured to cause a glint of light to reflect from the cornea of each eye of a wearer. The one or more image sensors 1012a, 1012b may then be configured to capture an image of the wearer's eyes. Images of the glints and of the pupils as determined from image data gathered from the image sensors 1012a, 1012b may be used by the controller 1006 to determine an optical axis of each eye. Using this information, the controller 1006 may be configured to determine a direction the wearer is gazing. The controller 1006 may be configured to additionally determine an identity of a physical and/or virtual object at which the wearer is gazing by projecting the user's gaze vector onto a 3D model of the surrounding environment.

The one or more outward facing image sensors 1005 may be configured to measure physical environment attributes of the physical environment in which the display system is located (e.g., light intensity). Data from the outward facing image sensors 1005 may be used to detect movements within a field of view of the display 1004, such as gesture-based inputs or other movements performed by a wearer or by a person or physical object within the field of view. In one example, data from the outward facing image sensors 1005 may be used to detect a selection input performed by the wearer of the display system, such as a gesture (e.g., a pinching of fingers, closing of a fist, etc.), that indicates selection of a UI object displayed on the display device. Data from the outward facing sensors may also be used to determine direction/location and orientation data (e.g. from imaging environmental features) that enables position/motion tracking of the display system 1000 in the real-world environment. Data from the outward facing camera also may be used to construct still images and/or video images of the surrounding environment from the perspective of the display system 1000.

The IMU 1007 may be configured to provide position and/or orientation data of the display system 1000 to the controller 1006. In one embodiment, the IMU 1007 may be configured as a three-axis or three-degree of freedom (3DOF) position sensor system. This example position sensor system may, for example, include three gyroscopes to indicate or measure a change in orientation of the display system 1000 within 3D space about three orthogonal axes (e.g., roll, pitch, and yaw). The orientation derived from the sensor signals of the IMU may be used to display, via the see-through display, one or more AR images with a realistic and stable position and orientation.

In another example, the IMU 1007 may be configured as a six-axis or six-degree of freedom (6DOF) position sensor system. Such a configuration may include three accelerometers and three gyroscopes to indicate or measure a change in location of the display system 1000 along three orthogonal spatial axes (e.g., x, y, and z) and a change in device orientation about three orthogonal rotation axes (e.g., yaw, pitch, and roll). In some embodiments, position and orientation data from the outward facing image sensors 1005 and the IMU 1007 may be used in conjunction to determine a position and orientation of the display system 1000.

The display system 1000 may also support other suitable positioning techniques, such as GPS or other global navigation systems. Further, while specific examples of position sensor systems have been described, it will be appreciated that any other suitable position sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

Continuing with FIG. 10A, the controller 1006 may be configured to record multiple eye gaze samples over time based on information detected by the one or more inward facing image sensors 1012*a*, 1012*b*. For each eye gaze sample, eye tracking information and, in some embodiments, head tracking information (from image sensors 1005 and/or IMU 1007) may be used to estimate an origin point and a direction vector of that eye gaze sample to produce an estimated location at which the eye gaze intersects the see-through display. Examples of eye tracking information and head tracking information used to determine an eye gaze sample may include an eye gaze direction, head orientation, eye gaze velocity, eye gaze acceleration, change in angle of eye gaze direction, and/or any other suitable tracking information. In some embodiments, eye gaze tracking may be recorded independently for both eyes of the wearer of the display system 1000.

Controller 1006 may be configured to generate or update a three-dimensional model of a surrounding environment using information from outward facing image sensors 1005. Additionally or alternatively, information from outward facing image sensors 1005 may be communicated to a remote computer responsible for generating and/or updating a model of the surrounding environment. It either case, the relative position and/or orientation of the display system relative to the surrounding environment may be assessed so that augmented reality images may be accurately displayed in desired real world locations with desired orientations. Furthermore, controller 1006 may determine which parts of the surrounding environment are currently in the FOV.

As mentioned above, the display system 1000 may also include one or more microphones, such as microphone 1011, that capture audio data. In some examples, the one or more microphones 1011 may comprise a microphone array including two or more microphones. For example, the microphone array may include four microphones, two positioned above the right lens and two positioned above the left lens of the HMD. Further, audio outputs may be presented to the wearer via one or more speakers, such as speakers 1009.

The controller 1006 may include a logic machine and a storage machine, discussed in more detail above with respect to FIG. 9, in communication with the display and the various sensors of the display system.

Figure 10B:
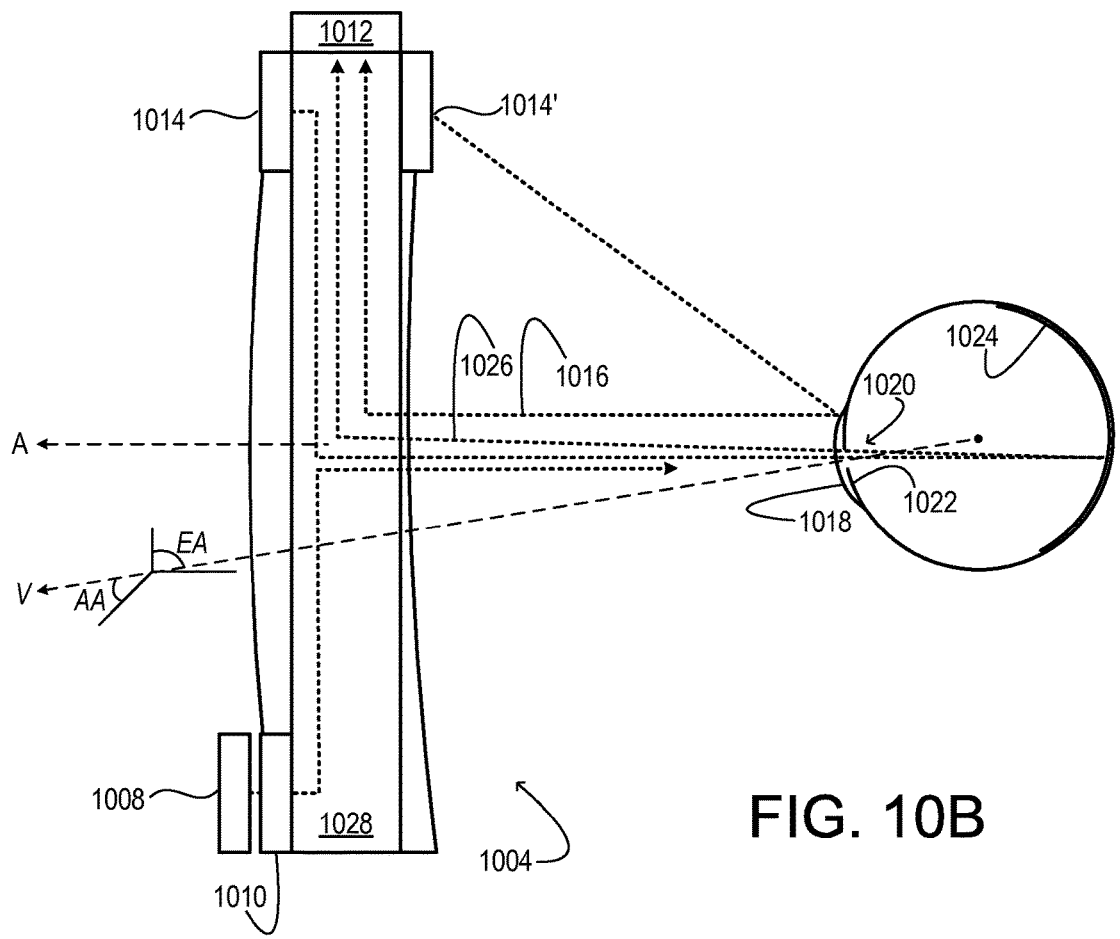

FIG. 10B shows selected aspects of right or left display panel 1004 (1004R, 1004L) in one, non-limiting embodiment. The display panel includes a backlight 1008 and a liquid-crystal display (LCD) type microdisplay 1010. The backlight may include an ensemble of light-emitting diodes (LEDs)—e.g., white LEDs or a distribution of red, green, and blue LEDs. The backlight may be configured to direct its emission through the LCD microdisplay, which forms a display image based on control signals from controller 1006. The LCD microdisplay may include numerous, individually addressable pixels arranged on a rectangular grid or other geometry. In some embodiments, pixels transmitting red light may be juxtaposed to pixels transmitting green and blue light, so that the LCD microdisplay forms a color image. In other embodiments, a reflective liquid-crystal-on-silicon (LCOS) microdisplay or a digital micromirror array may be used in lieu of the LCD microdisplay of FIG. 10B. Alternatively, an active LED, holographic, or scanned-beam microdisplay may be used to form right and left display images. Although the drawings show separate right and left display panels, a single display panel extending over both eyes may be used instead.

Display panel 1004 of FIG. 10B includes an eye-imaging camera 1012 (e.g., outward-facing imaging sensor 1012*a* or 1012*b*), an on-axis illumination source, also referred to as light source 1014, and an off-axis illumination source 1014'. Each illumination source emits infrared (IR) or near-infrared (NIR) illumination in a high-sensitivity wavelength band of the eye-imaging camera. Each illumination source may comprise a light-emitting diode (LED), diode laser, discharge illumination source, etc. Through any suitable objective-lens system, eye-imaging camera 1012 detects light over a range of field angles, mapping such angles to corresponding pixels of a sensory pixel array. Controller 1006 may be configured to use the output from the eye-imaging camera to track the gaze axis V of the wearer, as described in further detail below.

On- and off-axis illumination serve different purposes with respect to gaze tracking. As shown in FIG. 10B, off-axis illumination can create a specular glint 1016 that reflects from the cornea 1018 of the wearer's eye. Off-axis illumination may also be used to illuminate the eye for a 'dark pupil' effect, where pupil 1020 appears darker than the surrounding iris 1022. By contrast, on-axis illumination from an IR or NIR source may be used to create a 'bright pupil' effect, where the pupil appears brighter than the surrounding iris. More specifically, IR or NIR illumination from on-axis illumination source 1014 illuminates the retroreflective tissue of the retina 1024 of the eye, which reflects the light back through the pupil, forming a bright image 1026 of the pupil. Beam-turning optics 1028 of display panel 1004 enable the eye-imaging camera and the on-axis illumination source to share a common optical axis A, despite their arrangement on the periphery of the display panel.

Digital image data from eye-imaging camera 1012 may be conveyed to associated logic in controller 1006 or in a remote computer system accessible to the controller via a network. There, the image data may be processed to resolve such features as the pupil center, pupil outline, and/or one or more specular glints 1016 from the cornea. The locations of such features in the image data may be used as input parameters in a model—e.g., a polynomial model—that relates feature position to the gaze axis V. In embodiments where a gaze axis is determined for the right and left eyes, the controller may also be configured to compute the wearer's focal point as the intersection of the right and left gaze axes.

An example wearable, head-mounted display system comprises a near-eye display to display an augmented reality object perceivable at an apparent real world depth and an apparent real world location by a wearer of the head-mounted display system and a controller to adjust the apparent real world location of the augmented reality object as a function of a field of view (FOV) of the wearer, the function based on a bounding region of the augmented reality object and one or more overlap parameters between the bounding region of the augmented reality object and the FOV of the wearer. Such an example additionally or alternatively includes wherein the bounding region defines a space of the augmented reality object. Such an example additionally or alternatively includes wherein the space includes all of the augmented reality object. Such an example additionally or alternatively includes wherein the space includes less than all of the augmented reality object. Such an example additionally or alternatively includes wherein the space includes all of the augmented reality object and additional space surrounding the augmented reality object. Such an example additionally or alternatively includes wherein the one or more overlap parameters define an amount of the bounding region that the controller is to keep within the FOV. Such an example additionally or alternatively includes wherein the one or more overlap parameters comprise a resting target overlap value between the bounding region and the FOV of the wearer when the FOV changes by less than a threshold amount. Such an example additionally or alternatively includes wherein the one or more overlap parameters comprise a moving minimum overlap value between the bounding region and the FOV of the wearer when the FOV changes by more than the threshold amount. Such an example additionally or alternatively includes wherein the resting target overlap value is larger than the moving minimum overlap value, and wherein the controller displays a larger proportion of the bounding region when the FOV is changing by less than the threshold amount relative to when the FOV is changing by more than the threshold amount. Such an example additionally or alternatively includes wherein the moving minimum overlap value is less than a threshold overlap value, and wherein the controller does not display the augmented reality object when the FOV is changing by more than the threshold amount. Such an example additionally or alternatively includes wherein the controller further adjusts a rotation of the augmented reality object based on the FOV of the wearer. Such an example additionally or alternatively includes wherein the controller adjusts the apparent real world location of the augmented reality object according to one or more spring parameters of a virtual spring function. Such an example additionally or alternatively includes wherein the controller adjusts the apparent real world location of the augmented reality object when the augmented reality object is outside the FOV. Such an example additionally or alternatively includes wherein the controller maintains the augmented reality object at a fixed apparent real world location in response to a request from the wearer. Such an example additionally or alternatively includes wherein when the FOV of the wearer is changing by more than a threshold amount, the controller displays the augmented reality object at a smaller, first apparent real world size, and when the FOV of the wearer is changing by less than the threshold amount, the controller displays the augmented reality object at a larger, second apparent real world size. Such an example additionally or alternatively includes wherein the controller maintains the augmented reality object at a fixed proportion of the FOV throughout a range of apparent real world depths of the augmented reality object. Any or all of the above-described examples may be combined in any suitable manner in various implementations.

An example method for a near-eye display comprises defining a bounding region of an augmented reality object, defining a target amount of overlap between the bounding region and a field of view (FOV) of a wearer of the near-eye display, defining a minimum amount of overlap between the bounding region and the FOV, and as the FOV changes, displaying the augmented reality object on the near-eye display according to the bounding region, target amount of overlap, and minimum amount of overlap. Such an example additionally or alternatively further includes displaying the augmented reality object according to one or more spring parameters of a virtual spring function. Such an example additionally or alternatively further includes adjusting a rotation of the augmented reality object based on the FOV of the wearer. Any or all of the above-described examples may be combined in any suitable manner in various implementations.

A further example of a wearable, head-mounted display system comprises a near-eye display to display an augmented reality object perceivable at an apparent real world depth and an apparent real world location by a wearer of the head-mounted display system and a controller to adjust the apparent real world location of the augmented reality object as a function of a field of view (FOV) of the wearer, the function based on a bounding region of the augmented reality object, a target overlap value between the bounding region and the FOV of the wearer when the FOV changes by less than a threshold amount, and a minimum overlap value between the bounding region and the FOV of the wearer when the FOV changes by more than the threshold amount. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A wearable, head-mounted display system comprising:
   a near-eye display to display an augmented reality object perceivable at an apparent real world location by a wearer of the head-mounted display system; and
   a controller to adjust the apparent real world location of the augmented reality object as a function of a field of view (FOV) of the wearer, including moving the apparent real world location of the augmented reality object along with the FOV when the FOV is changing, the function based on a bounding region of the augmented reality object and one or more overlap parameters between the bounding region of the augmented reality object and the FOV of the wearer.

2. The display system of claim 1, wherein the bounding region defines a space of the augmented reality object.

3. The display system of claim 2, wherein the space includes all of the augmented reality object.

4. The display system of claim 2, wherein the space includes less than all of the augmented reality object.

5. The display system of claim 2, wherein the space includes all of the augmented reality object and additional space surrounding the augmented reality object.

6. The display system of claim 1, wherein the one or more overlap parameters define an amount of the bounding region that the controller is to keep within the FOV.

7. The display system of claim 6, wherein the one or more overlap parameters comprise a resting target overlap value between the bounding region and the FOV of the wearer when the FOV changes by less than a threshold amount.

8. The display system of claim 7, wherein the one or more overlap parameters comprise a moving minimum overlap value between the bounding region and the FOV of the wearer when the FOV changes by more than the threshold amount.

9. The display system of claim 8, wherein the resting target overlap value is larger than the moving minimum overlap value, and wherein the controller displays a larger proportion of the bounding region when the FOV is changing by less than the threshold amount relative to when the FOV is changing by more than the threshold amount.

10. The display system of claim 8, wherein the moving minimum overlap value is a negative overlap value, and wherein the controller does not display the augmented reality object when the FOV is changing by more than the threshold amount.

11. The display system of claim 1, wherein the controller further adjusts a rotation of the augmented reality object based on the FOV of the wearer.

12. The display system of claim 1, wherein the controller adjusts the apparent real world location of the augmented reality object according to one or more spring parameters of a virtual spring function.

13. The display system of claim 1, wherein the controller adjusts the apparent real world location of the augmented reality object when the augmented reality object is outside the FOV.

14. The display system of claim 1, wherein the controller maintains the augmented reality object at a fixed apparent real world location in response to a request from the wearer.

15. The display system of claim 1, wherein when the FOV of the wearer is changing by more than a threshold amount, the controller displays the augmented reality object at a smaller, first apparent real world size, and when the FOV of the wearer is changing by less than the threshold amount, the controller displays the augmented reality object at a larger, second apparent real world size.

16. The display system of claim 1, wherein the controller maintains the augmented reality object at a fixed proportion of the FOV throughout a range of apparent real world depths of the augmented reality object.

17. A method for a near-eye display, comprising:
   defining a bounding region of an augmented reality object;
   defining a target amount of overlap between the bounding region and a field of view (FOV) of a wearer of the near-eye display;
   defining a minimum amount of overlap between the bounding region and the FOV; and
   as the FOV changes, displaying the augmented reality object on the near-eye display to follow the FOV according to the bounding region, target amount of overlap, and minimum amount of overlap.

18. The method of claim 17, further comprising displaying the augmented reality object according to one or more spring parameters of a virtual spring function.

19. The method of claim 17, further comprising adjusting a rotation of the augmented reality object based on the FOV of the wearer.

20. A wearable, head-mounted display system comprising:
   a near-eye display to display an augmented reality object perceivable at an apparent real world location by a wearer of the head-mounted display system; and
   a controller to adjust the apparent real world location of the augmented reality object as a function of a field of view (FOV) of the wearer, the function configured to move the apparent real world location of the augmented reality object to follow the FOV when the FOV changes based on a bounding region of the augmented reality object, a target overlap value between the bounding region and the FOV of the wearer when the FOV changes by less than a threshold amount, and a minimum overlap value between the bounding region and the FOV of the wearer when the FOV changes by more than the threshold amount.

* * * * *